(12) United States Patent (10) Patent No.: US 9,515,877 B1
Tempel et al. (45) Date of Patent: Dec. 6, 2016

(54) SYSTEMS AND METHODS FOR ENROLLING AND CONFIGURING AGENTS

(71) Applicant: Crimson Corporation, Dover, DE (US)

(72) Inventors: Mark Robert Tempel, New Brighton, MN (US); Sean Michael McDonald, New Brighton, MN (US); Nicholas Paul Krueger, New Brighton, MN (US); Matthew Mark Hazzard, New Brighton, MN (US); Kevin Gerard Olson, New Brighton, MN (US)

(73) Assignee: Crimson Corporation, Dover, DE (US)

( * ) Notice: Subject to any disclaimer, the term of this patent is extended or adjusted under 35 U.S.C. 154(b) by 0 days.

(21) Appl. No.: 14/445,353

(22) Filed: Jul. 29, 2014

(51) Int. Cl.
*H04L 12/24* (2006.01)
*H04L 29/06* (2006.01)
*H04L 12/58* (2006.01)

(52) U.S. Cl.
CPC ....... *H04L 41/0806* (2013.01); *H04L 63/0823* (2013.01); *H04L 51/00* (2013.01); *H04L 63/20* (2013.01)

(58) Field of Classification Search
CPC ...... H04L 63/0209; H04L 63/20; H04L 51/38; H04L 51/00; H04L 63/02; H04L 41/0806; H04L 63/0823
See application file for complete search history.

(56) References Cited

U.S. PATENT DOCUMENTS

| | | | |
|---|---|---|---|
| 2008/0298459 A1* | 12/2008 | Yang et al. ................... | 375/240 |
| 2012/0179802 A1* | 7/2012 | Narasimhan et al. ........ | 709/223 |
| 2013/0178190 A1* | 7/2013 | Celi et al. ..................... | 455/411 |
| 2013/0318242 A1* | 11/2013 | Srinivasa .............. | G06F 9/5011 |
| | | | 709/226 |
| 2014/0040975 A1* | 2/2014 | Raleigh et al. ................... | 726/1 |
| 2014/0122670 A1* | 5/2014 | Levy et al. ................... | 709/220 |
| 2014/0143137 A1* | 5/2014 | Carlson .......................... | 705/39 |
| 2014/0215590 A1* | 7/2014 | Brand .............................. | 726/6 |
| 2014/0223521 A1* | 8/2014 | Ashok ..................... | H04L 41/28 |
| | | | 726/5 |
| 2015/0188777 A1* | 7/2015 | Frost ................................ | 726/6 |

* cited by examiner

*Primary Examiner* — Don Zhao
(74) *Attorney, Agent, or Firm* — Austin Rapp & Hardman

(57) ABSTRACT

A method of managing an agent by an administrative server is described. The method includes receiving an enrollment request from the agent. The agent is disconnected from a core server, and the core server is periodically connected to the administrative server. The method also includes performing a provisional enrollment procedure with the agent. The method further includes performing an enrollment procedure between the agent and the core server. The method additionally includes performing a configuration procedure between the agent and the core server.

23 Claims, 12 Drawing Sheets

SYSTEMS AND METHODS FOR ENROLLING AND CONFIGURING AGENTS

TECHNICAL FIELD

The present disclosure generally relates to computers and computer-related technology. More specifically, the present disclosure relates to systems and methods for securely enrolling and configuring loosely connected autonomous agents.

BACKGROUND

The use of electronic devices has become increasingly prevalent in modern society. As the cost of electronic devices has declined and as the usefulness of electronic devices has increased, people are using them for a wide variety of purposes. For example, many people use electronic devices to perform work tasks as well as to seek entertainment. One type of an electronic device is a computer.

Computer technologies continue to advance at a rapid pace. Computers commonly used include everything from hand-held computing devices to large multi-processor computer systems. These computers include software, such as applications including user interfaces, in order to make them useful and accessible to an end user. Computers are increasingly linked with other computers through networks. With the expansion of computer technology, the size of networks has continued to increase. Networks may link computers together that are a great distance apart.

One of the challenges involved with networks is that it is difficult to enroll and configure networked computing devices under contemporary practices when the computing devices never or only intermittently share a direct connection, where a direct connection between devices means that one device can establish a communication session with another device via a communications protocol that allows immediate send and receive operations. Additionally, current methods of enrolling and configuring loosely connected devices may burden a network and jeopardize a network's data security. As can be observed from this discussion, systems and methods that make enrolling and configuring loosely connected autonomous agents secure may be beneficial to the management of a computer network.

DETAILED DESCRIPTION

Figure 1:
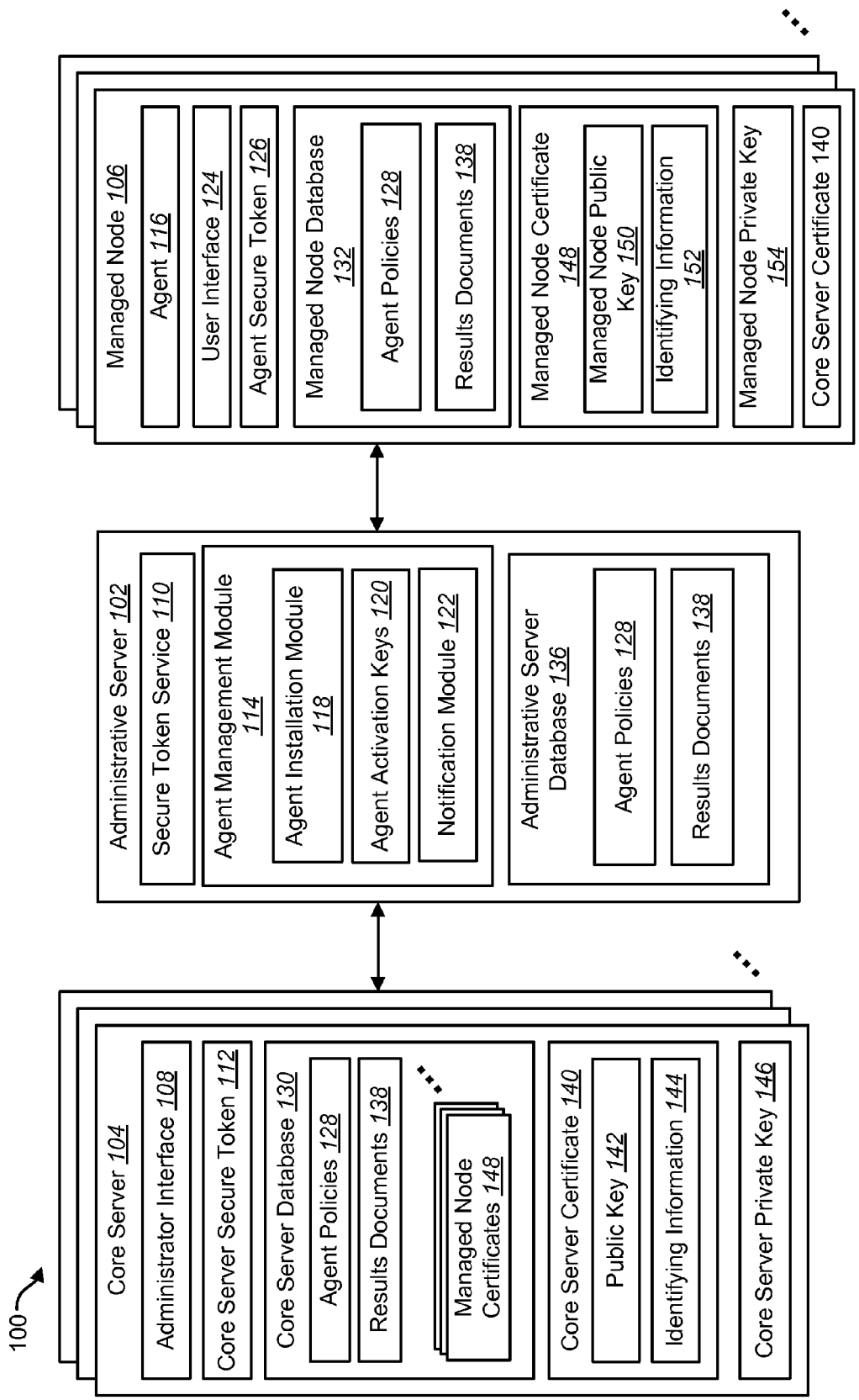
FIG. 1 is a block diagram illustrating one configuration of a cloud-based network that includes a plurality of electronic devices that are in electronic communication with one another via a connection to an administrative server.

A method of managing an agent by an administrative server is described. The method includes receiving an enrollment request from the agent. The agent is disconnected from a core server, and the core server is periodically connected to the administrative server. The method also includes performing a provisional enrollment procedure with the agent. The method further includes performing an enrollment procedure between the agent and the core server. The method additionally includes performing a configuration procedure between the agent and the core server.

Performing the provisional enrollment procedure may include storing an enrollment request. Performing the provisional enrollment procedure may also include sending a provisional enrollment policy to the agent in response to the enrollment request.

Performing the enrollment procedure between the agent and the core server may include sending an enrollment request received from the agent to the core server. An enrollment response and policy may be received from the core server in response to the enrollment request. The enrollment response and policy may be stored. A request for the enrollment response and policy from the agent may be received. The enrollment response and policy may be sent to the agent.

The enrollment request from the agent may be created using authentication information received from the core server via the administrative server. The administrative server may be a multi-tenant cloud-based administrative server.

Performing the configuration procedure between the agent and the core server may include receiving configuration information from the core server. The configuration information may be stored. The configuration information may be sent to the agent in response to a request from the agent for the configuration information. Configuration and administrative operation results may be received from the agent. The configuration and administrative operation results may be sent to the core server in response to a request from the core server for the configuration and administrative operation results.

The configuration information may include past configurations of the agent with serial numbers indicating the latest configuration information. Confidential configuration information may be encrypted with a digital certificate public key of the agent and signed with a digital certificate private key of the core server. Non-confidential configuration information may be signed with a digital certificate private key of the core server.

Confidential configuration information results may be encrypted with a digital certificate public key of the core server and signed with a digital certificate private key of the agent. Non-confidential configuration information results may be signed with a digital certificate private key of the agent.

A computing device that is configured for managing an agent is also described. The computing device includes a processor, memory in electronic communication with the processor, and instructions stored in the memory. The computing device receives an enrollment request from the agent. The agent is disconnected from a core server, and the core server is periodically connected to the computing device. The computing device also performs a provisional enrollment procedure with the agent. The computing device further performs an enrollment procedure between the agent and the core server. The computing device additionally performs a configuration procedure between the agent and the core server.

As indicated above, aspects of the present disclosure are directed to improvements related to securely enrolling and configuring loosely connected autonomous agents. When a new computing device is being added to a computer network, the computer network administrator may enroll the computing device in a network management system, and configure the computing device to operate in a manner desired by the administrator of that computer network. Because of this, computer network administrators may resort to various techniques of device enrollment and configuration.

Some approaches for controlling enrollment in a management system and controlling configuration rely on establishing a direct connection between a core server and the computing device. In such approaches, the core server may perform enrollment and configuration procedures on the computing device directly. For devices that are capable of establishing such a direct connection, this may be adequate. However, for computing devices and core servers that rarely, or never, establish a direct connection, these approaches are not adequate.

As demonstrated, there is a need for systems and methods for enrolling and configuring a computing device that is rarely and or never directly connected to a core server. Further, there is a need for systems and methods that may also make enrollment and configuration of the computing device secure and efficient. The systems and methods disclosed herein facilitate this device enrollment and configuration, and may further make these operations secure. Compared to other approaches, the systems and methods disclosed herein may further decrease time requirements and inefficiencies related to enrolling and configuring a loosely connected computing device. Aspects of the present disclosure will be described in relation to a computing network that includes various components for managing computing devices belonging to an enterprise.

In many IT infrastructures, there are nodes being managed that do not have a direct connection to the system used to manage them. In these cases, autonomous agents that communicate via a trusted infrastructure may be used to manage those nodes. The systems and methods described herein may allow autonomous agents to enroll with a management system when not connected to the same network as the management system by using a cloud-based intermediary. Further, the systems and methods described herein describe the manner in which the management system configures autonomous agents via the cloud-based intermediary.

In one configuration, the described systems and methods may involve a core server (e.g., management system), an administrative server (e.g., a cloud-based intermediary), and an autonomous agent. Management decisions are made at the core server, and communicated to the autonomous agent via the administrative server. The autonomous agent enacts those decisions on a managed node on which they are installed. To perform these operations, the core server must have a secure channel to communicate with autonomous agents.

The autonomous agent may enroll with the administrative server by providing an externally generated authentication token. The administrative server may give the autonomous agent an enrollment response that allows the autonomous agent to perform a restricted set of operations on the management network. This response places the agent into an enrollment mode termed provisionally enrolled.

The core server may communicate with the administrative server on a periodic basis, and may retrieve pending enrollment requests. The core server may optionally validate the externally generated authentication token used to provisionally enroll the autonomous agent. When the core server receives enrollment requests, it evaluates the enrollment request to determine if the agent is allowed to join the trusted communications infrastructure. If the autonomous agent is allowed on the infrastructure, the core server may complete the enrollment and upload the completed information to the administrative server for the autonomous agent to retrieve.

Once the agent is enrolled with the core server, the core server will have a secure channel to communicate management decisions via configuration information to the autonomous agents. The configuration data may be created on the core server, passed through the administrative server and consumed by the autonomous agent.

Configuration data may be one of two types: content that must be authenticated-only, and content that must be authenticated and confidential. All content is signed by the core server. Authenticated-only content can be read by the administrative server. Content that is confidential is encrypted with the public key of its intended recipient (in most cases, the autonomous agent) and cannot be read by the administrative server.

The described systems and methods may allow both the autonomous agent and the core server to independently communicate with the administrative server to submit and/or retrieve information. The core server may apply configuration changes to disconnected agents by sending a combination of non-confidential and confidential information to the administrative server to describe the latest configuration state.

The administrative server may have information to determine if new content is available to the autonomous agent and will only return configuration data to the agent if new data is available. The autonomous agent may periodically poll the administrative server to determine whether or not it has the latest information. If new information is retrieved, the agent will apply the new configuration, authenticate all information and decrypt confidential information. In the case where the autonomous agent may connect directly to the core server, the agent may use configuration data serial numbers to determine whether or not it has received stale information from the administrative server.

Various configurations of the systems and methods are now described with reference to the Figures, where like reference numbers may indicate identical or functionally similar elements. The configurations of the present systems and methods, as generally described and illustrated in the Figures herein, could be arranged and designed in a wide variety of different configurations. Thus, the following more detailed description of several configurations, as represented in the Figures, is not intended to limit the scope of the systems and methods, as claimed, but is merely representative of the various configurations of the systems and methods.

FIG. 1 is a block diagram illustrating one configuration of a network 100 that includes a plurality of electronic devices that are in electronic communication with one another via a connection to an administrative server 102. The network 100 may include one or more core servers 104 and one or more managed nodes 106 that are coupled to the administrative server 102.

The network 100 may be a multi-tenant cloud-based architecture that enables one or more different tenants to access a common administrative server 102 without interfering with one another's operations. The one or more tenants may be one or more different enterprises. In one configuration, one or more managed nodes 106 and one or more core servers 104 may be operated by one tenant (e.g., enterprise, client, customer, etc.) while other managed nodes 106 and other core servers 104 may be operated by one or more other tenants. Therefore, the network 100 may be a multi-tenant architecture.

In one configuration, the core server 104 may be intermittently connected to the administrative server 102. In other words, the core server 104 may have periods of time when it is not connected to the administrative server 102 followed by periods when the core server 104 may connect to and communicate with the administrative server. The core server 104 may be unable to connect to the managed node 106. For example, a network firewall may prevent the core server 104 from directly accessing the managed node 106.

The one or more managed nodes 106 may be desktop computers, laptop computers, tablet computers, smartphones, printers, etc. The one or more core servers 104 may perform a variety of management-related operations with respect to the one or more managed nodes 106. Examples of these management-related operations may include managing the node's 106 operating configurations, the node's 106 files, security patches, system updates, etc.

If a managed node 106 is a new electronic device that has not yet been enrolled and configured by a core server 104, the core server 104 may not be able to perform management-related functions with respect to the managed node 106. Further, when the managed node 106 is rarely or never directly connected to the core server 104, the core server 104 may not be able to enroll and or configure an agent 116 operating on the managed node 106. This problem may be alleviated through the disclosed systems and methods of enrolling and configuring a managed node 106 without a direct connection to the core server 104.

The administrative server 102 may be in electronic communication with the one or more core servers 104 and the one or more managed nodes 106. The administrative server 102 may perform a variety of management-related operations with respect to the one or more core servers 104 and or one or more managed nodes 106. Examples of management-related operations may include providing infrastructure services, node administration, etc. The administrative server 102 may be part of a software-as-a-service (SaaS) or cloud-based architecture in which one or more clients (e.g., customers, tenants, client-organizations) may independently operate a managed node 106 but may interface with the administrative server 102 for one or more services. In one configuration, the administrative server 102 implementation may be included as part of a software as a service (SaaS) or a multi-tenant cloud-based architecture. The multi-tenant cloud-based architecture may be a cloud-based network 100 that enables one or more different tenants to access the administrative server 102 without being aware of or interfering with the operations of another tenant. The one or more tenants may be one or more different enterprises. The cloud-based network 100 may enroll and configure a managed node 106 that is rarely or never directly connected to a core server 104.

In order to securely communicate and perform management operations with the administrative server 102, the core server 104 administrator may use an administrator interface 108 to negotiate with a secure token service 110 on the administrative server 102 for a core server secure token 112. The core server secure token 112 may enable the core server 104 to access management functions on the administrative server 102. For instance, the core server secure token 112 may allow the administrator of the core server 104 to access an agent management module 114 on the administrative server 102. The agent management module 114 may be used to manage an agent 116 operating on a managed node 106. Managing an agent 116 operating on a managed node 106 may include performing enrollment and configuration procedures without a direct connection between the core server 104 and the managed node 106.

The agent management module 114 may include an agent installation module 118 designed to install and configure the agent 116 on a managed node 106. The administrator of the core server 104 may use the agent installation module 118 to designate which managed nodes 106 need to have the agent 116 installed.

The administrator on the core server 104 may further allocate agent activation keys 120 on the agent management module 114 to complete the installation of the agents 116. The agent activation keys 120 may be used to authenticate the installation and configuration of the agent 116 on the managed node 106. After the administrator has allocated agent activation keys 120 and designated a managed node 106 in the agent installation module 118, the agent management module 114 may use a notification module 122 to notify the managed node 106 of the agent installation and configuration information. The notification module 122 may notify an administrator of the managed node 106 of the agent installation information via several mechanisms. For example, the notification may be in the form of an email, a desktop notification, etc.

After receiving the notification from the notification module 122, the administrator of the managed node 106 may use a user interface 124 to provide the agent installation module 114 with an activation key. The activation key will allow the agent installation module 118 to install and configure the agent 116 on the managed node 106.

The agent 116 installed on the managed node 106 may enable the core server 104 and administrative server 102 to perform management-related functions with respect to the managed node 106, even when the managed node 106 never or rarely directly connects to the core server 104. For instance, the agent 116 may allow the core server 104 to send agent policies 128 stored in a core server database 130 to a managed node database 132. A database is any stored collection of data, in various kinds of structures include a simple flat file database to a complex database management system (DBMS). The databases may include keyed indexed storage. The databases 114, 116 may include a stored collection of data that may be accessed by applications To accomplish this, the agent policies 128 may first be sent to an administrative server database 136, where the agent 116 on the managed node 106 may retrieve it.

The agent 116 installed on the managed node 106 may use the agent policies 128 to perform management actions that produce result documents 138. Result documents 138 may represent configuration information, operation status information or operational audits reports detailing actions taken by the autonomous agent. The result documents 138 may be sent to the administrative server database 136 on the administrative server 102. The result documents 138 may then be sent from the administrative server 102 to the core server 104 and stored on the core server database 130. Managed node certificates 148, described below, may be stored in the core server database 130.

The core server may include a core server certificate 140. The core server certificate 140 may be a digital certificate used in a public key cryptography. Public-key cryptography, which is also known as asymmetric cryptography, refers to a cryptographic algorithm that requires two separate keys: a private key and a public key. These keys may be referred to collectively as a key pair. The private key is kept secret, but the public key is widely distributed. A private key and its corresponding public key are mathematically linked, but the parameters are chosen so that calculating the private key from the public key is extremely difficult.

Public-key cryptography facilitates computing devices to securely communicate with one another. In particular, a message that is digitally "signed" (i.e., processed in accordance with an appropriate cryptographic algorithm) using the sender's private key may be verified by anyone who has access to the sender's public key. A valid digital signature gives a recipient reason to believe that the message was actually created by the sender.

A digital certificate is an electronic document that uses a digital signature to bind a public key with an entity. Thus, digital certificates may be used to verify that a particular message originated from a particular computing entity, and may be used to encrypt messages for specific recipients. Each core server certificate 140 may include a public key 142 of the core server 104 and information 144 identifying the core server 104. Each core server certificate 140 may also be associated with a core server private key 146 of the core server 104. The managed node 106 may have a copy of the core server certificate 140 of its managing core server 104 installed to validate messages sent by the core server 104.

In a manner similar to the core server 104, managed nodes 106 may be issued a managed node certificate 148. The managed node certificate 148 may include a managed node public key 150 and identifying information 152 of the managed node 106. The managed node public key 150 may correspond to a managed node private key 154. The core server 104 may also have a copy of managed node certificates 148.

The administrative server 102 may be configured to perform a number of operations involved in managing the agent 116 on the managed node 106. The administrative server 102 may receive an enrollment request from the agent 116. The agent 116 may be disconnected from a core server 104, and the core server 104 may be periodically connected to the administrative server 102. Upon receiving the enrollment request from the agent 116, the administrative server 102 may perform a provisional enrollment procedure with the agent 116 that may enable the agent 116 to be provisionally managed by the administrative server 102. One configuration of a provisional enrollment procedure is described in connection with FIG. 6.

The administrative server 102 may also perform an enrollment procedure between the agent 116 and the core server 104 that may enable the agent 116 to be managed by the core server 104 via the administrative server 102. One configuration of an enrollment procedure is described in connection with FIGS. 7 and 8.

The administrative server 102 may additionally perform a configuration procedure between the agent 116 and the core server 104. The configuration procedure may be a means of managing the managed node 106 by the core server 104 via the administrative server 102 and the agent 116. Some implementations of configuration procedures are described in connection with FIGS. 9 and 10.

Figure 2:
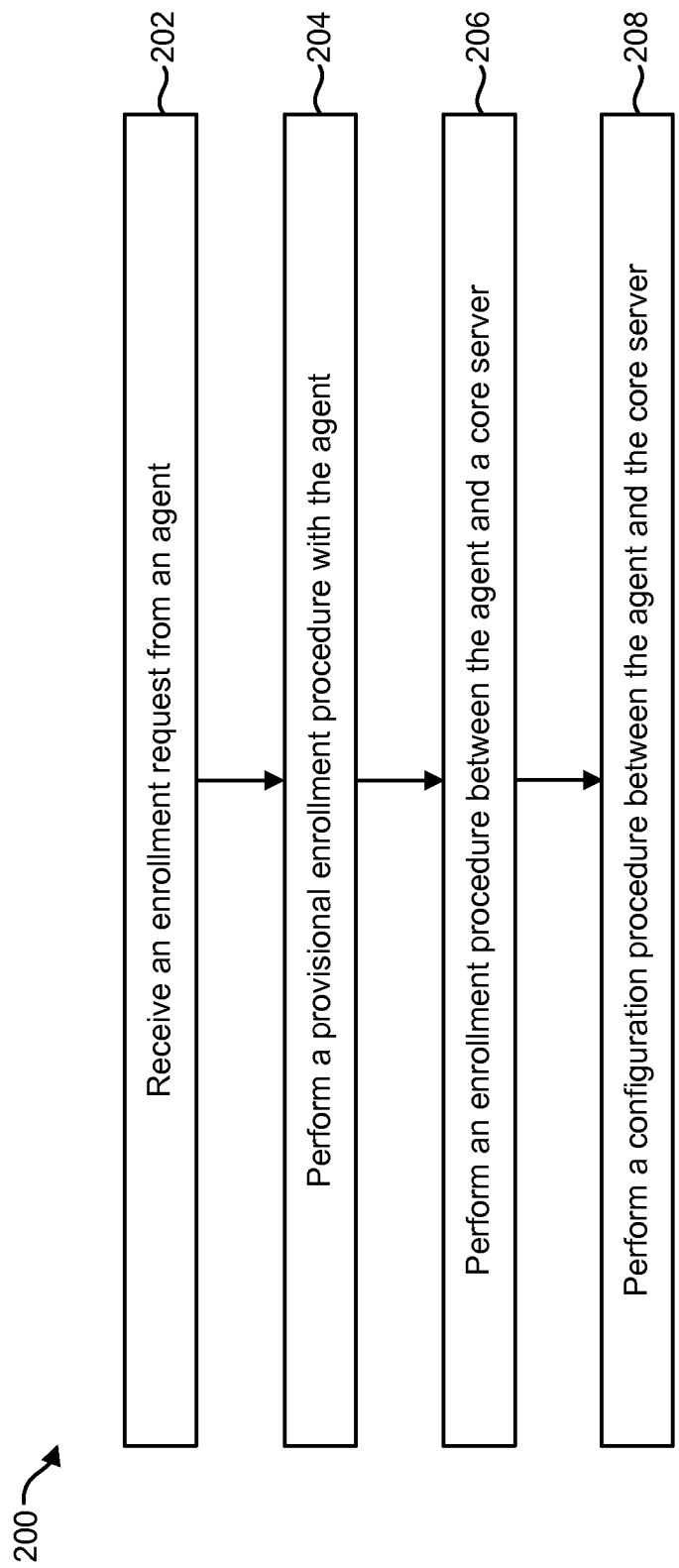
FIG. 2 is a flow diagram illustrating a method of enrolling an agent operating on a managed node.

FIG. 2 is a flow diagram illustrating one configuration of a method 200 of managing an agent 116 operating on a managed node 106. The method 200 may be implemented by an administrative server 102 that is connected to an agent 116 operating on a managed node 106 and a core server 104. The managed node 106 may not be connected to the core server 104.

The administrative server 102 may receive 202 an enrollment request from the agent 116. For example, when an agent 116 is installed on the managed node 106, it may need to be enrolled with a managing core server 104 in order to be managed properly. To become enrolled with the core server 104, the agent 116 on the managed node 106 may create an enrollment request that is sent to the core server 104. Because the agent 116 on the managed node 106 is not directly connected to the core server 104, the administrative server 102 may serve as an intermediary between the managed node 106 and the core server 104. Therefore, the administrative server 102 may receive 202 the enrollment request from the agent 116. The enrollment request may include information such as agent activation keys 120 that were defined by the core server 104 administrator and sent to the managed node 106 administrator by the administrative server 102.

The administrative server 102 may perform 204 a provisional enrollment procedure with the agent 116 on the managed node 106. The provisional enrollment procedure may include storing the enrollment request on an administrative server database 136. The provisional enrollment procedure may further include the administrative server 102 sending a provisional enrollment policy to the managed node 106.

The provisional enrollment policy may include a variety of agent policies 128 to be used while the enrollment request is being delivered to the core server 104 and processed. For example, the provisional enrollment policy may include agent policies 128 instructing the agent to not perform tasks, to periodically poll the administrative server 102 for an enrollment policy, etc. The provisional enrollment policy may further include a temporary managed node certificate 148 to be used in identifying the managed node 106. Further the agent 116 may remove itself from the managed node 106 if a timeout, specified in calendar time, has occurred before it is fully enrolled.

The administrative server 102 may perform 206 an enrollment procedure between the agent 116 and the core server 104. For instance, the core server 104 may be configured to poll the administrative server 102 periodically to check for agent enrollment requests. A first step in the enrollment procedure may be to send any enrollment requests (from the agent 116 on the managed node 106) stored in the administrative server database 136 to the requesting core server 104. Upon receiving the enrollment requests, the core server 104 administrator may be able to grant or deny the full enrollment policies in response to the agent 116 enrollment requests.

The administrative server 102 may then receive either the granted full enrollment response for the agent 116 or a notification of denial from the core server 104. The enrollment response or notification of denial may be stored in the administrative server database 136. The provisional policy delivered to the agent 116 on the managed node 106 may configure the agent 116 to periodically poll the administrative server 102 for a stored enrollment response to the enrollment request. Upon receiving the poll for an enrollment response from the agent 116, the administrative server 102 may send the enrollment response and agent policy 128 to the agent 116 on the managed node 106.

The administrative server 102 may perform 208 a configuration procedure between the agent 116 on the managed node 106 and the core server 104. A configuration procedure may include many potential operations between the agent 116 on the managed node 106 and the core server 104.

For example, a configuration procedure may involve applying new agent policies 128 to an agent 116 on a managed node 106. An administrator of the core server 104 may decide to update the agent policies 128 of the one or more agents 116 on one or more managed nodes 106 that are managed by that particular core server 104. In such a circumstance, the administrative server 102 may receive the updated agent policy 128 from the core server 104 and store it in the administrative server database 136. The administrative server 102 may send the stored agent policy 128 to an agent 116 on a managed node 106 in response to a periodic poll from the agent 116 requesting updated agent policies 128. The agent 116 on the managed node 106 may receive the updated agent policies 128 and may store them to the managed node database 132.

In another example, a configuration procedure may involve an agent 116 performing an operation on a managed node 106 and sending a results document 138 from the operation to the core server 104. For instance, the agent policies 128 delivered to the agent 116 by the core server 104 in the previous example may include instructions for the agent 116 to perform an operation (e.g. a malware scan, a file catalog, etc.) that produces a results document 138. The administrative system 102 may receive the results document 138 from the agent 116 on the managed node 106 and may store the results document 138 on the administrative server database 136. The administrative server 102 may then send the results document 138 to the core server 104 in response to a periodic request received from the core server 104 for the results document. The core server 104 may then receive the results document 138 and use it to better configure the managed node 106.

Figure 3:
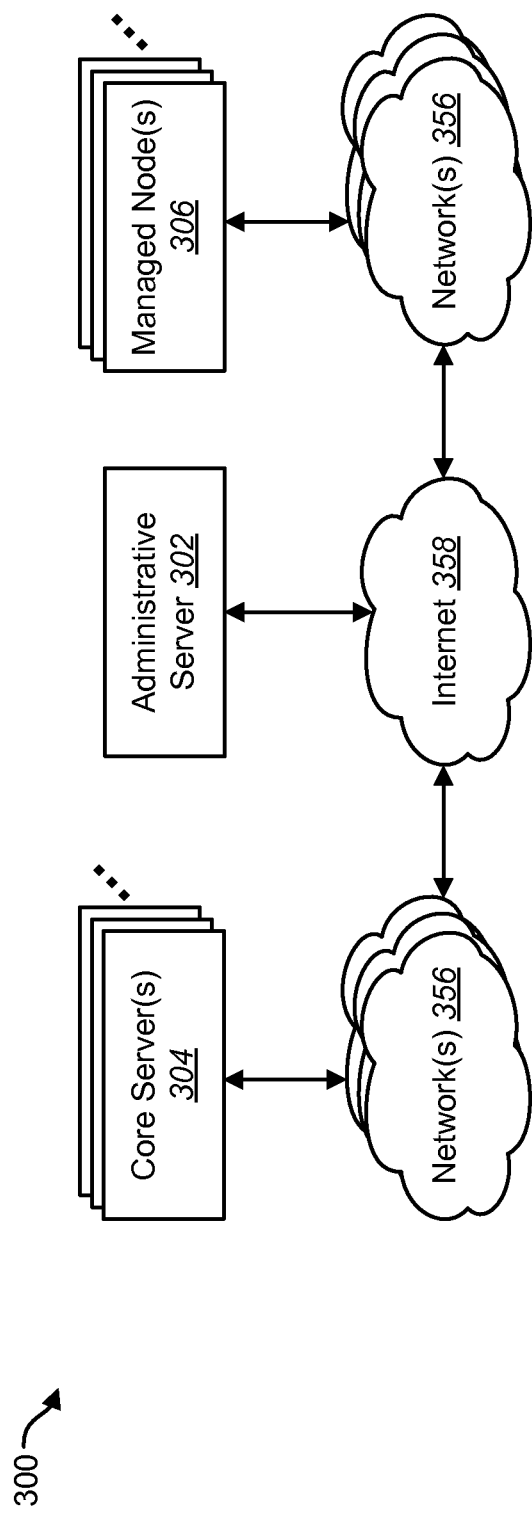
FIG. 3 illustrates another configuration of a cloud-based network in which systems and methods for managing an agent by an administrative system may be implemented.

FIG. 3 illustrates a configuration of a cloud-based network 300 in which systems and methods for managing an agent 116 by an administrative system 102 may be implemented. The cloud-based network 300 may have a plurality of core servers 304, a plurality of managed nodes 306, and a plurality of networks 356. The cloud-based network 300 may include an administrative server 302. The core server 304 may be similar to the core server 104 described in connection with FIG. 1. The managed node 306 may be similar to the managed node 106 described in connection with FIG. 1. The administrative server 302 may be similar to the administrative server 102 described in connection with FIG. 1.

The one or more networks 356, and the corresponding managed nodes 306 and core servers 304 on each network 356 may all be owned and operated by one enterprise. The one or more networks 356, and the corresponding managed nodes 306 and core servers 304 on each network 356, may alternatively be owned and operated by one or more different enterprises. The one or more networks 356 may be incapable of communicating with each other. For instance the networks 356 could be separate subnets of an enterprise, or could be on networks 356 that do not share a direct connection. Alternatively, the one or more networks 356 may be capable of communicating with each other. For instance, the networks 356 may be on the same subnet of an enterprise, or may intermittently share a direct connection. The one or more networks 356 and the administrative server 302 may be connected to the Internet 358. The administrative server 302 may facilitate operations described herein.

Figure 4:
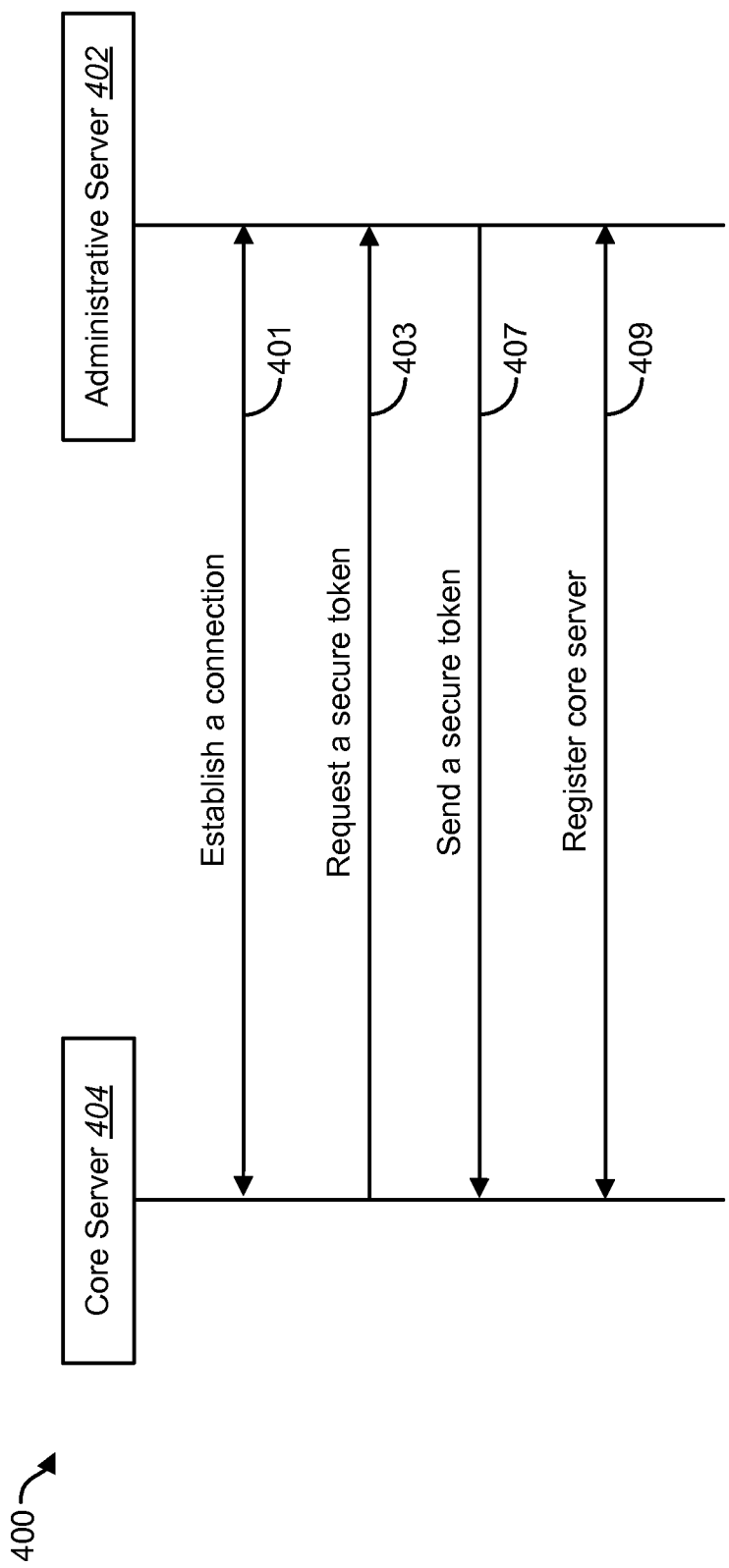
FIG. 4 is a sequence diagram that illustrates various operations that may be performed between a core server and an administrative server in registering a core server.

FIG. 4 is a sequence diagram that illustrates various operations 400 that may be performed between a core server 404 and an administrative server 402 in registering a core server 404. The core server 404 may be intermittently connected to the administrative server 402. The core server 404 may establish 401 a connection to an administrative server 402. After establishing 401 a connection with the administrative server 402, the core server 404 may request 403 a core server secure token 112 from the secure token service 110 on the administrative server 402. In one configuration, the request for the core server secure token 112 may be based upon registration credentials entered into a web portal. The request may further consist of other credentials such as a core server 404 administrator password, core server 404 identifying information, etc.

The core server secure token 112 may enable the core server 404 to access the agent management module 114 on the administrative server 402. Once accessed, the agent management module 114 on the administrative server 402 may enable the core server 404 to register 409 itself with the administrative system 402 as a core server 404 capable of managing an agent 116 on a managed node 106. This registration 409 may include the core server certificate 140 and may enable the administrative server 402 to provide management support to the core server 404, such as storing data, performing agent 116 management-related operations, etc.

Figure 5:
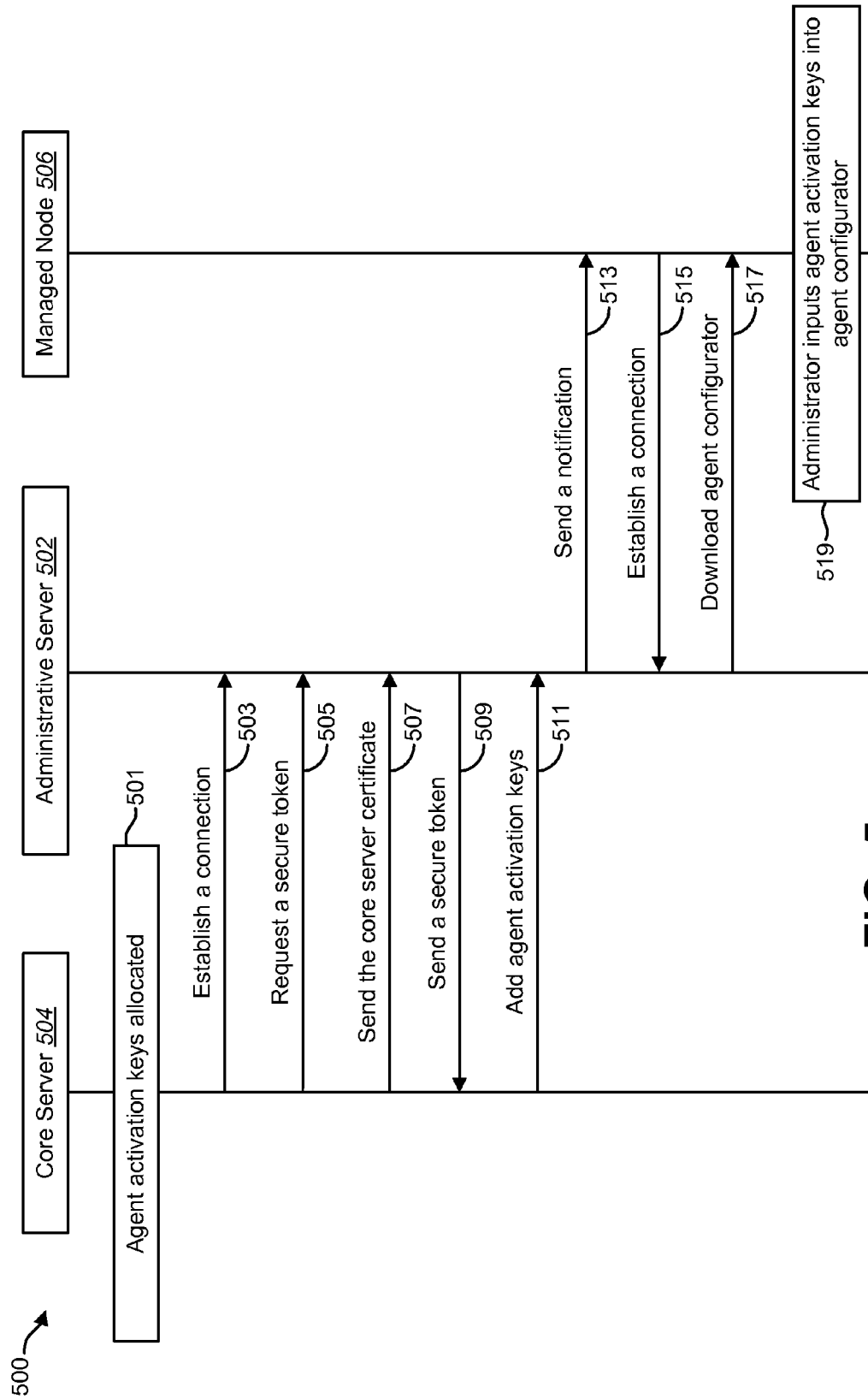
FIG. 5 is a sequence diagram that illustrates various operations that that may be performed by a core server, an administrative server and a managed node in installing and configuring an agent.

FIG. 5 is a sequence diagram that illustrates various operations 500 that that may be performed by a core server 504, an administrative server 502 and a managed node 506 in installing and configuring an agent 116. The administrator on a managed node 506 may install the agent 116 on the managed node 506. The newly added agent 116 may not yet be fully manageable by the core server 504 or administrative server 502 as it has not yet been configured using a corresponding agent activation key 120. Further, the agent 116 may not be capable of establishing a direct connection to the core server 504. Alternatively, the agent 116 may be capable of establishing only an intermittent or infrequent direct connection to the core server 504.

In order to manage the new agent 116, an administrator on a core server 504 may allocate 501 agent activation keys 120 for the agent 116 on a managed node 506. The administrator may allocate 501 agent activation keys 120 in order to validate that the agent 116 is authorized by the core server 504 to operate on the managed node 506. Agent activation keys 120 may include a passcode that is shared between an administrator of the managed node 506 and the administrator of the core server 504, a line of computer language that automatically activates a selected agent 116 on a managed node 506, etc. The agent activation keys 120 may be a cryptographic nonce or may include information from the administrator of the managed node 506 such as identification information, email address, etc.

The core server 504 may establish 503 a connection with an administrative server 502. This connection may be a direct connection via the Internet 358, a direct connection via a network 356, etc. The core server 504 may request 505 a secure token from the secure token service 110 on the administrative server 502. The request may be based upon some registration credentials entered into a web portal. The request may consist of other credentials such as a core server 504 administrator password, core server 504 identifying information, etc.

The core server 504 may send 507 the core server certificate 140 as credentials. The core server certificate 140 may serve to authenticate that the request for a secure token (e.g., a core server secure token 112) originated from the core server 504 and that the core server 504 may be trusted. The administrative server 502 may authenticate the request for a core server secure token 112 automatically using the provided credential information. The administrative server 502 may alternatively authenticate the request for a core server secure token 112 with the input of a human administrative server 502 administrator. Once the administrative server 502 has authenticated the request for a core server secure token 112, it may send 509 the core server secure token 112 to the core server 504.

The core server secure token 112 may enable the core server 504 to access the agent management module 114 on the administrative server 502. Once accessed, the core server 504 may add 511 agent activation keys 120 to the agent management module 114 on the administrative server 502. The agent activation keys 120 may be the same activation keys 120 allocated 501 by the core server administrator in step 501. The agent activation keys 120 may include one or more different agent activation keys 120 previously allocated by a core server 504 administrator for one or more new agents 116 on one or more managed nodes 506.

After the agent activation keys 120 have been added 511 to the agent management module 114, the administrative server 502 may send 513 a notification to the managed node 506. For example, the notification module 122 on the agent management module 114 of the administrative server 502 may be configured to send 513 a notification to the managed node 506. This notification may be sent 513 to the administrator of the managed node 506 using the identifying information included in the agent activation keys 120. This notification may also be configured to be sent 513 automatically, or it may be configured to be sent 513 at the discretion of an administrator.

The notification sent 513 to the managed node 506 by the administrative server 502 may include the agent activation keys 120 for the new agent 116 on the managed node 506 and information to access the agent installation module 118 on the agent management module 114. The administrator of the managed node 506 may use the information contained in the notification to enable the agent 116 operating on the managed node 506 to be activated and configured so that the core server 504 and administrative server 502 may perform management-related functions on the agent 116 operating on the managed node 506.

Using the information contained in the notification sent 513 by the notification module 122 to the agent 116 on the managed node 506, the managed node 506 may establish 515 a connection with the administrative server 502. This connection may be a direct connection via the Internet 358, a direct connection via a network 356, etc.

The managed node 506 may download 517 an agent configurator. The agent configurator may be designed to install and apply configuration settings to the agent 116 on the managed node 506. The administrator of the managed node 506 may input 519 the agent activation keys 120 contained in the notification sent 513 by the notification module 122 into the agent configurator. The agent activation keys 120 may authorize the agent configurator to begin configuring the agent 116 on the managed node 506 so that the core server 504 and administrative server 502 may perform management-related functions with respect to the agent 116.

Figure 6:
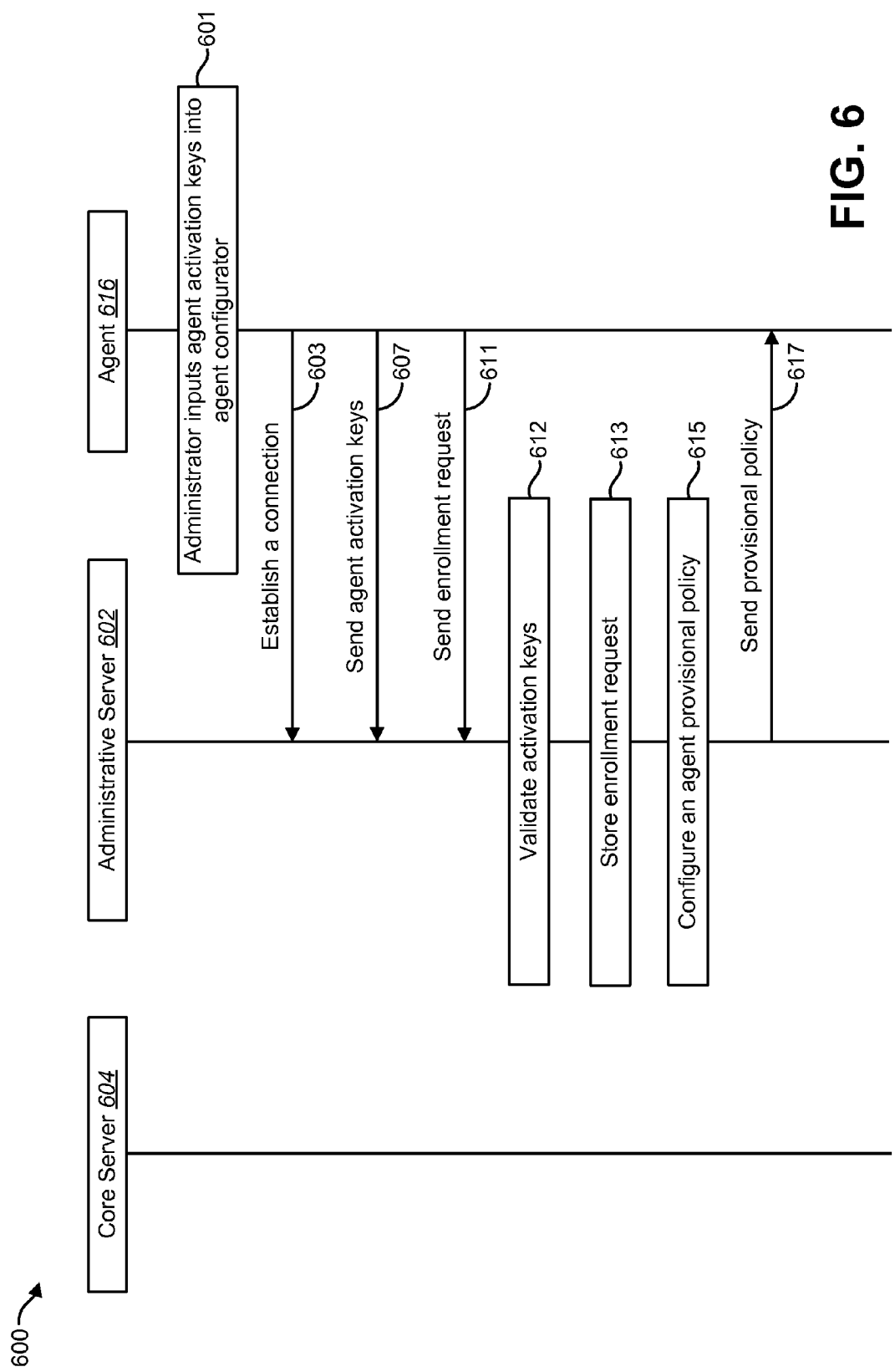
FIG. 6 is a sequence diagram that illustrates various operations that that may be performed between an administrative server and an agent during a provisional enrollment procedure.

FIG. 6 is a sequence diagram that illustrates various operations 600 that may be performed between an administrative server 602 and an agent 616 during a provisional enrollment procedure. An administrator may input 601 agent activation keys 120 into an agent configurator of the agent 616. This may be accomplished as described in connection with FIG. 5. At some point after the administrator of the managed node 106 inputs 601 the agent activation keys 120 into the agent configurator, the agent 616 may establish 603 a connection with the administrative server 602.

The agent 616 may send 607 the agent activation keys 120 entered into the agent configurator to the administrative server 602. The administrative server 602 may use the agent activation keys 120 to validate 612 the enrollment request 611. In order for the agent 616 to function properly, it may be enrolled with the core server 604 and obtain agent policies 128 which may apply various configurations to the agent 616. To enroll and obtain these agent policies 128, the agent 616 may send 611 an enrollment request to the administrative server 602 for the administrative system 602 to deliver to the core server 604. The enrollment request 611 may contain a managed node certification request.

The administrative server 602 may store 613 the enrollment request in the administrative server database 136 for when the next connection is established between the administrative server 602 and the core server 604. The administrative server 602 may configure 615 an agent provisional policy while the enrollment request is pending.

The agent provisional policy may include a temporary digital certificate that may identify the agent 616 on the managed node 106. The agent provisional policy may include a provisional agent policy that applies temporary agent policies 128 to the agent 616. As an example of temporary agent policies that may be applied to the agent 616, the provisional agent policies may apply a temporary configuration that instructs the agent 616 to poll the administrative server 602 for core server 604 issued agent policies 128 at specific time intervals. The administrative server 602 may send 617 the agent provisional policy to the agent 616 on the managed node 106.

Figure 7:
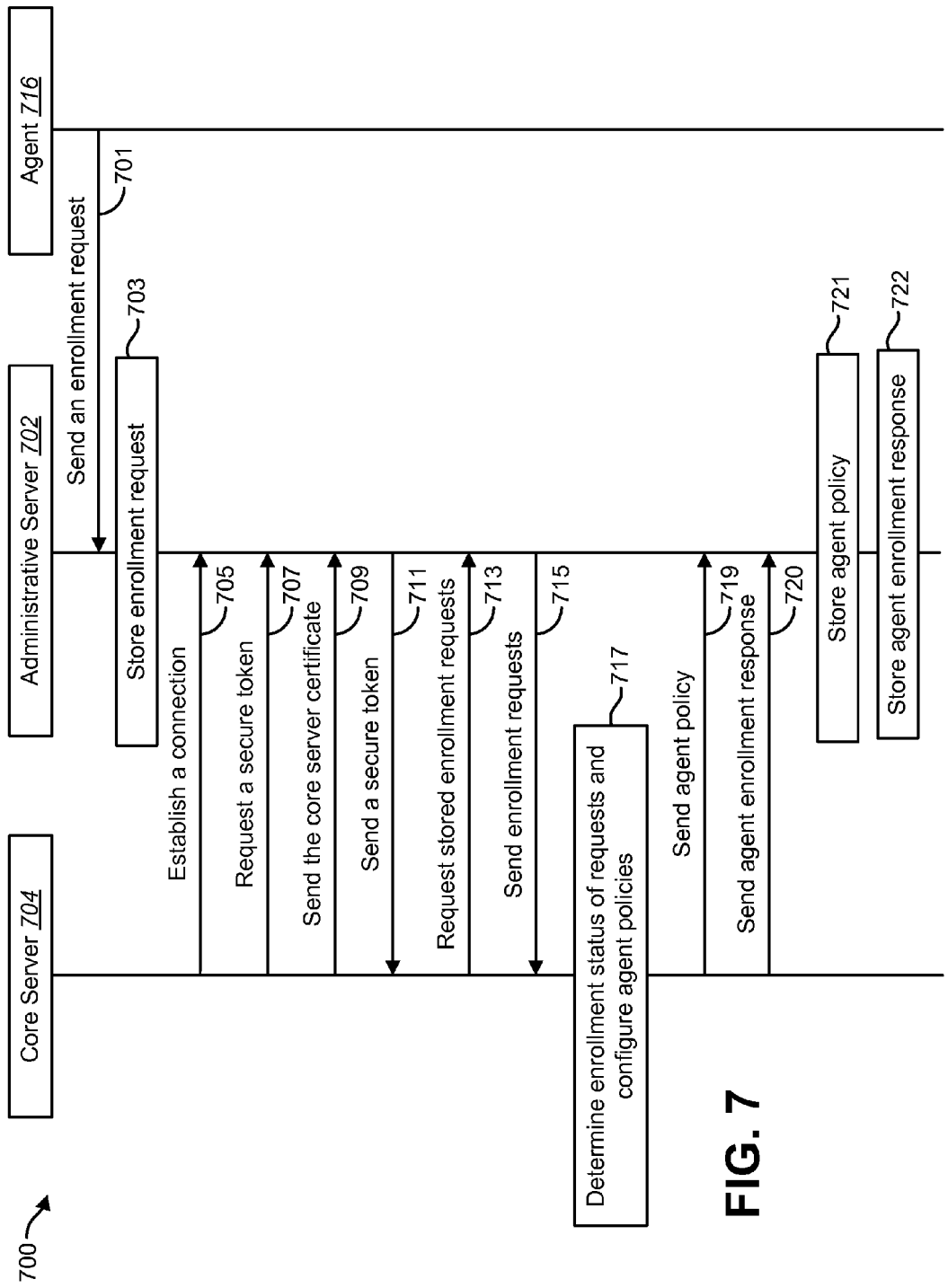
FIG. 7 is a sequence diagram that illustrates various operations that may be performed by a core server, an administrative server and an agent during an enrollment procedure.

FIG. 7 is a sequence diagram that illustrates various operations 700 that may be performed by a core server 704, an administrative server 702 and an agent 716 during an enrollment procedure. The agent 716 may send 701 an enrollment request to the administrative server 702. The administrative server 702 may store 703 the enrollment request from the agent 716. This may be accomplished as described in connection with FIG. 6. The administrative server 702 may have intermittent connections with the core server 704. At some point after the administrative server 702 stores 703 the enrollment request from the agent 716, the core server 704 may establish 705 a connection to the administrative server 702.

This connection may be a direct connection via the Internet 358, a direct connection via a network 356, etc. The core server 704 may request 707 a secure token from the secure token service 110 on the administrative server 702. The request may be based upon registration credentials entered into a web portal. The request may also consist of other credentials such as a core server 704 administrator password, core server 704 identifying information, etc.

The core server 704 may send 709 the core server certificate 140 as credentials. The core server certificate 140 may serve to authenticate that the request for a secure token originated from the core server 704. The core server certificate 140 may indicate that the core server 704 can be trusted. The administrative server 702 may authenticate the request for a core server secure token 112 automatically using the provided credential information. The administrative server 702 may alternatively authenticate the request for a core server secure token 112 with the input of an administrative server 702 administrator. Once the administrative server 702 has authenticated the request for a core server secure token 112, it may send 711 the core server secure token 112 to the core server 704.

After the core server 704 has received the core server secure token 112, the core server 704 may request 713 that any stored enrollment requests be sent from the administrative server 702 to the core server 704. The administrative server 702 may send 715 all stored enrollment requests to the core server 704 in response to this request. It should be noted that the administrative server 702 may send enrollment requests associated with one or more agents 716.

The core server 704 may determine 717 the enrollment status of the enrollment requests and configure agent policies 128. In determining 717 the enrollment status of the enrollment requests, the core server 704 may authorize or deny enrollment for each enrollment request. Authorizing an enrollment request acknowledges that the agent 716 making the enrollment request has been granted valid agent activation keys 120 and that the agent 716 should be sent permanent agent policies 128. The core server 704 may then configure the agent policies 128 based on the desired operations of the administrator of the core server 704. For example, the agent policies 128 may be configured to instruct the agent 716 to perform a wide variety of operations including running malware scans, taking program inventories, gathering user logs, etc. The agent policies 128 may also include managed node certificates 148 that will be used in identifying messages from the agent 716 operating on the managed node 706 and for secure transmissions. The agent policies 128 may further include any needed credentials, configuration information to maintain the health of the agent, etc.

The core server 704 may send 719 the agent policies 128 to the administrative server 702 for the administrative server 702 to deliver to the agent 716 on the managed node 506 during one of the agent's 716 periodic polls of the administrative server 702. The core server 704 may also send 720 agent enrollment response to the administrative server 702 for the administrative server 702 to deliver to the agent 716 on the managed node 706 during one of the agent's 716 periodic polls of the administrative server 702. The administrative server 702 may store 721 the agent policies 128 in the administrative server database 136. The administrative server 702 may also store 722 the agent enrollment response in the administrative server database 136.

Figure 8:
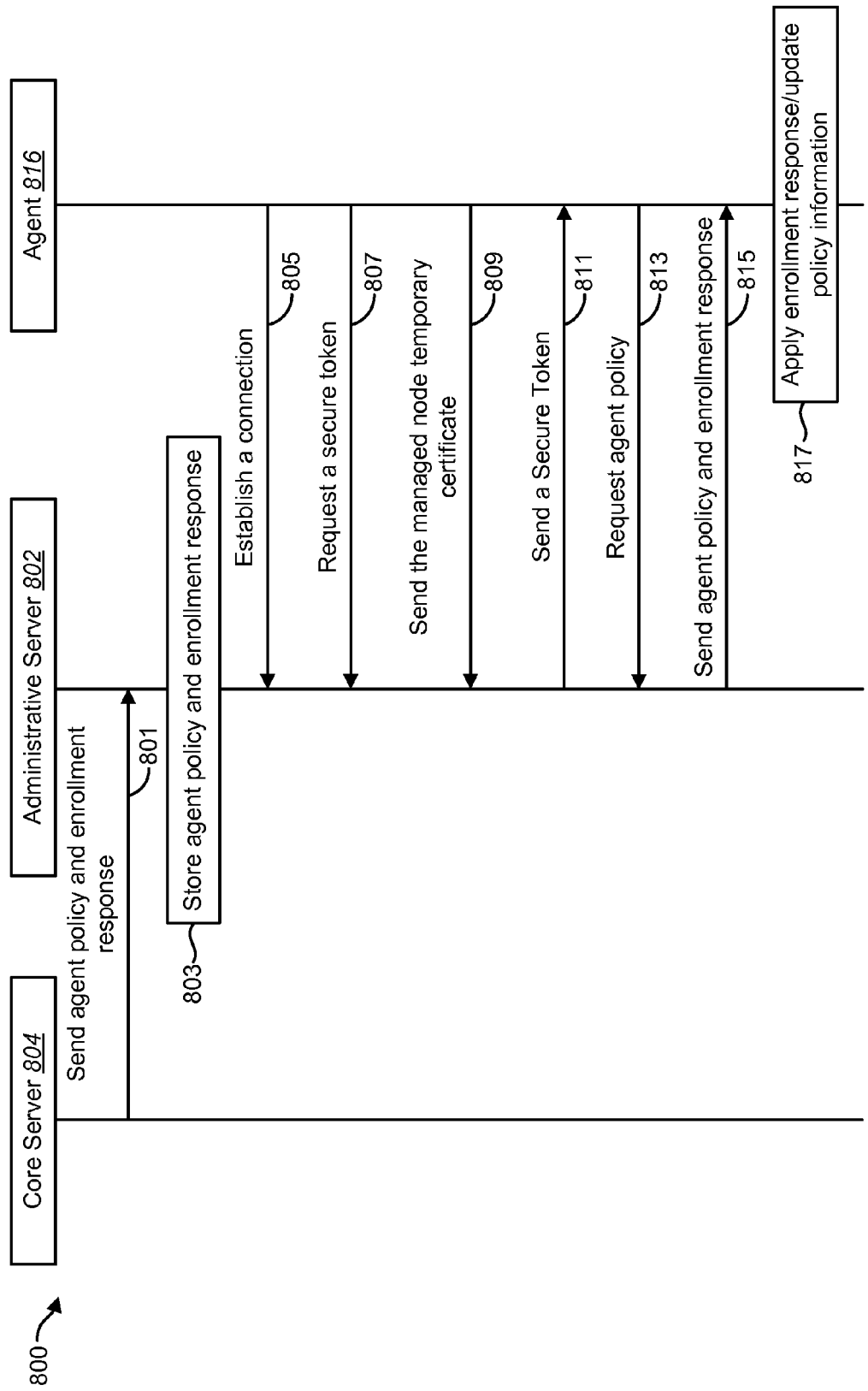
FIG. 8 is a sequence diagram that illustrates various operations that may be performed by a core server, an administrative server and an agent 816 during an enrollment procedure.

FIG. 8 is a sequence diagram that illustrates various operations 800 that may be performed by a core server 804, an administrative server 802 and an agent 816 during an enrollment procedure. The core server 804 may send 801 an agent policy and enrollment response to the administrative server 802. The administrative server 802 may store 803 the agent policy and enrollment response from the core server 804. This may be accomplished as described in connection with FIG. 7. At some point after the administrative server 802 stores 803 the agent policy and enrollment response, the agent 816 may establish 805 a connection with the administrative server 802.

The agent 816 may request 807 a secure token from the secure token service 110 on the administrative server 802. The agent 816 may send 809 the temporary managed node certificate issued to the agent 816 by the administrative server 802 during the provisional enrollment. The administrative server 802 may use the temporary managed node certificate to create and send 811 a secure token to the agent 816. The secure token sent 811 to the agent 816 may be referred to as an agent secure token 126.

After receiving the agent secure token 126, the agent 816 may request 813 delivery of any stored agent policies 128 from the administrative server 802. In response to this request 813, the administrative server 802 may send 815 the agent policies and enrollment response 128 to the agent 816. After receiving the agent policies 128 from the administrative server 802, the agent 816 may and apply 817 the enrollment response and update its agent policies 128 with the newly received agent policies 128. Updating the agent policies 128 may include applying the new managed node certificates 148, new configurations, etc., to the agent 816.

In one configuration, the managed node certificates 148 may be valid for a designated time period. The agent 816 on the managed node 106 may perform a recertification procedure to obtain a new managed node certificate 148 prior to the expiration of the current managed node certificate 148. To accomplish this, the agent 816 may submit a certification request to the administrative server 802. The administrative server 802 may store the certification request and may return an empty result to the agent 816. The empty result indicates to the agent 816 that the recertification response will be returned as an attachment to a later poll from the agent 816.

At some later time, the core server 804 may retrieve the certification request from the administrative server 802 and may issue a new managed node certificate 148 as a response. The core server 804 may send new managed node certificates 148 to the administrative server 802 where the administrative server 802 may store new managed node certificates 148.

The agent 816 may poll the administrative server 802 its new managed node certificate 148 and the administrative server 802 may send the new managed node certificate 148 to the agent 816 as a response. The agent 816 applies the new managed node certificate 148 to the managed node 106 and sends a message to the administrative server 802 informing the administrative server 802 that the new managed node certificate 148 is being used. This message may be sent to the core server 804, where the core server 804 may update its certificate data.

The core server 804 may send a message to the administrative server 802 indicating that it has updated its certificate data. The administrative server 802 may then update its certificate data. The agent 816 may try to authenticate with the administrative server 802 using the current managed node certificate 148 until authentication fails. At which time, the agent 816 will begin authenticating with the administrative server 802 using the new managed node certificate 148.

Figure 9:
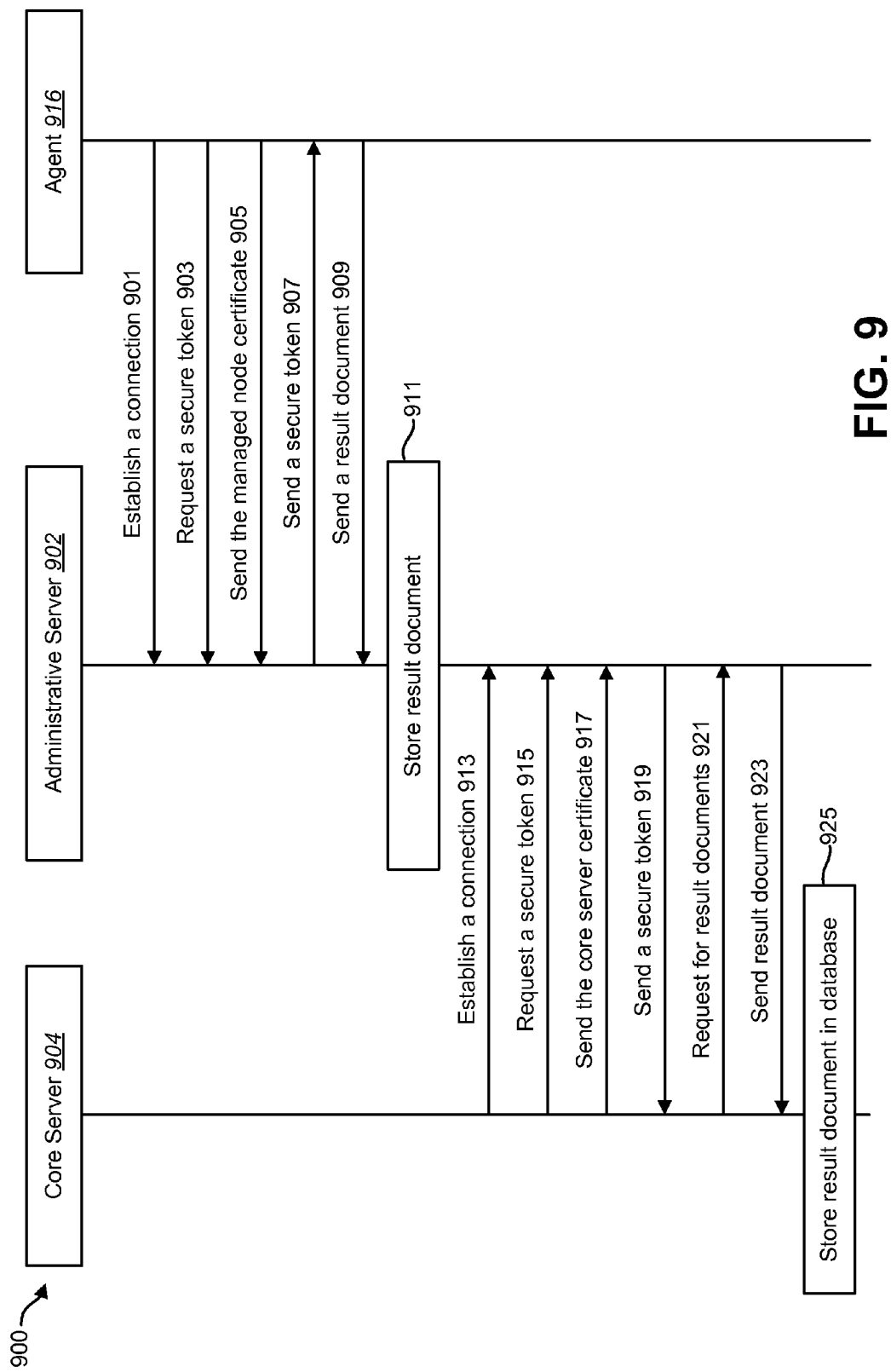
FIG. 9 is a sequence diagram that illustrates various operations that may be performed by a core server, an administrative server and an agent during a results document transfer.

FIG. 9 is a sequence diagram that illustrates various operations 900 that may be performed by a core server 904, an administrative server 902 and an agent 916 during a result transfer procedure. After an agent 916 has been enrolled with a core server 904 and has received agent policies 128 from the core server 904, the agent 916 may perform an operation as instructed by the agent policies 128. This operation may be a variety of operations that the administrator of the core server 904 desires and may be appropriate for the management of the managed node 106. For example, operations may include a malware scan, a file catalog, a user catalog, etc. At the completion of one of these operations, the results of the operation may need to be sent to the core server 904 for evaluation. In order to do so, the agent 916 operating on the managed node 106 may establish 901 a connection with the administrative server 902.

The agent 916 may request 903 a secure token from the secure token service 110 on the administrative server 902. The agent 916 may send 905 the managed node certificate 148 issued to the agent 916 operating on the managed node 106 by the core server 904 during the operations described in connection with FIGS. 7 and 8. The administrative server 902 may use the managed node certificate 148 to create and send 907 a secure token to the agent 916. The secure token sent 907 to the agent 916 may be referred to as an agent secure token 126.

After negotiating the agent secure token 126, the agent 916 operating on the managed node 106 may send 909 a results document 138 to the administrative server 902 for the administrative server 902 to deliver to the core server 904. The results document 138 may be results from an operation that was performed as instructed by the agent policies 128. For example, the results document 138 could be results from a malware scan, a file catalog, a user catalog, etc. The administrative server 902 may store 911 the results document 138 in the administrative server database 136.

In one scenario, the results document 138 may include sensitive information that may be need to be encrypted to protect the security of the information. In such a scenario, the agent 916 may encrypt the sensitive information with the core server 904 public key 142. After encrypting the information, it may be sent 909 and stored 911 securely on the administrative server 902. Because the information may only be decrypted by the core server private key 146 which only resides on the core server 904, the core server 904 is the only computing entity capable of deciphering the information.

In another scenario, the results document 138 may not include sensitive information. When the results document 138 does not need to be protected for data privacy, the agent 916 operating on the managed node 106 may sign the results document 138 with the managed node private key 154. Thus, another computing entity may be able to authenticate the information using the managed node public key 150, which may be distributed to computing devices in communication with the managed node 106.

The core server 904 may have intermittent connections to the administrative server 902. At some point after the administrative server 902 stores 911 the results document 138 from the agent 916, the core server 904 may establish 913 a connection with the administrative server 902.

This connection may be a direct connection via the Internet 358, a direct connection via a network 356, etc. The core server 904 may request 915 a secure token from the secure token service 110 on the administrative server 902. The request may be based upon registration credentials entered into a web portal. The request may also consist of other credentials such as a core server 904 administrator password, core server 904 identifying information, etc.

The core server 904 may send 917 the core server certificate 140 to the administrative server 902 as credentials. The core server certificate 140 may serve to authenticate the request for a secure token from the core server 904. The core server certificate 140 may indicate that the core server 904 can be trusted. The administrative server 902 may authenticate the request for a core server secure token 112 automatically using the provided credential information. The administrative server 902 may alternatively authenticate the request for a core server secure token 112 with the input of an administrative server 902 administrator. Once the administrative server 902 has authenticated the request for a core server secure token 112, it may send 919 the core server secure token 112 to the core server 904.

After receiving the core server secure token 112, the core server 904 may request 921 the results documents 138 from the administrative server 902. In response to this request 921 for results documents 138, the administrative server 902 may send 923 the results documents 138 stored on the administrative server database 136 to the core server 904. The core server 904 may store 925 the results documents 138 in the core server database 130.

Figure 10:
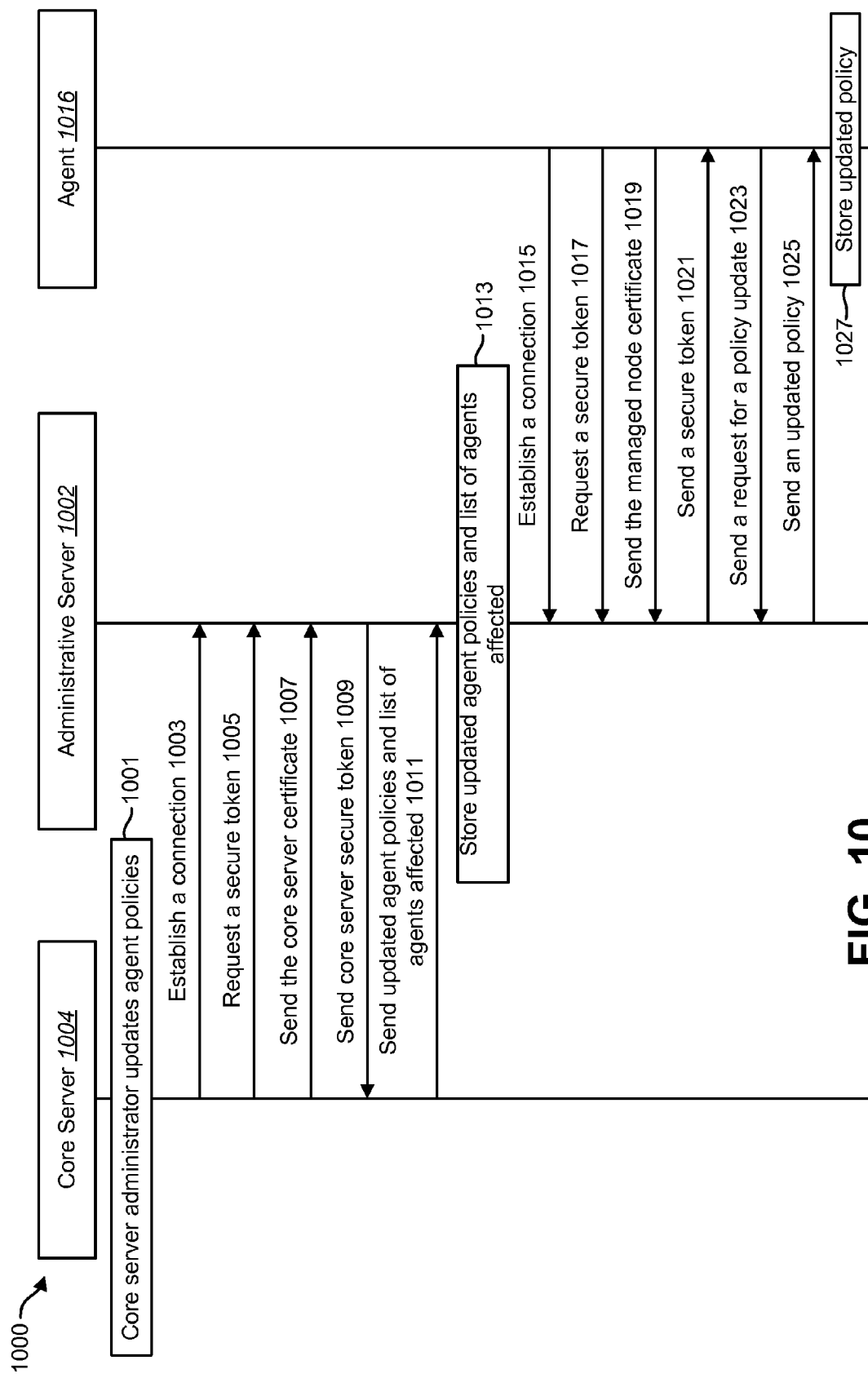
FIG. 10 is a sequence diagram that illustrates various operations that may be performed by a core server, an administrative server and an agent during a configuration procedure.

FIG. 10 is a sequence diagram that illustrates additional operations 1000 that may be performed by a core server 1004, an administrative server 1002 and an agent 1016 during a configuration procedure.

At some point after an agent 1016 operating on a managed node 106 is enrolled with a core server 1004 and has received agent policies 128, an administrator of the core server 1004 may update 1001 the agent policies 128 on the core server 1004. For instance, the administrator of the core server 1004 may desire to add an additional operation to those that are being conducted by the agents 1016 on the managed nodes 106. In order to update the agent 1016 on the managed node 106 with new agent policies 128, the core server 1004 may establish 1003 a connection to the administrative server 1002.

This connection may be a direct connection via the Internet 358, a direct connection via a network 356, etc. The core server 1004 may request 1005 a secure token from the secure token service 110 on the administrative server 1002. The request may be based upon registration credentials entered into a web portal. The request may also consist of other credentials such as a core server 1004 administrator password, core server 1004 identifying information, etc.

The core server 1004 may send 1007 the core server certificate 140 to the administrative server 1002 as credentials. The core server certificate 140 may serve to authenticate the request for a secure token sent from the core server 1004. The core server certificate 140 may indicate that the core server 1004 can be trusted. The administrative server 1002 may authenticate the request for a core server secure token 112 automatically using the provided credential information. The administrative server 1002 may alternatively authenticate the request for a core server secure token 112 with the input of an administrative server 1002 administrator. Once the administrative server 1002 has authenticated the request for a core server secure token 112, it may send 1009 the core server secure token 112 to the core server 1004.

After receiving the core server secure token 112, the core server 1004 may send 1011 the updated agent policies 128 and a list of the agents 1016 affected by the updates to the administrative server 1002. The updated agent policies 128 and list of agents 1016 affected may be stored 1013 in the administrative system database 136 on the administrative system 1002.

The updated agent policies 128 and list of agents 1016 affected may include sensitive information that may need to be encrypted to protect the security of the information. In such a scenario, the core server 1004 may encrypt the sensitive information with the managed node public key 150 for which an agent 1016 is operating on. After encrypting the information, it may be sent 1011 and stored 1013 securely on the administrative server 1002. Because the information may only be decrypted by the managed node private key 154, which only resides on the managed node 106, the agent 1016 operating on the managed node 106 is the only computing entity capable of deciphering the information.

The updated agent policies 128 and list of agents 1016 affected may not include sensitive information. When the updated agent policies 128 and list of agents 1016 affected does not need to be protected for data privacy, the core server 1004 may sign the agent policies 128 with the core server private key 146. Thus, another computing entity may be able to authenticate the information using the core server 1004 public key 142, which may be distributed to computing devices in communication with the core server 1004. By verifying the signature on the updated agent policies 128 and list of agents 1016 affected, the receiving computing device can verify that the updated agent policies 128 and list of agents 1016 affected was produced by the core server 1004.

At some point after the administrative server 1002 stores 1013 the updated agent policies 128 and list of agents 1016 affected, an agent 1016 may establish 1015 a connection with the administrative server 1002.

The agent 1016 may request 1017 a secure token from the secure token service 110 on the administrative server 1002. The agent 1016 may send 1019 the managed node certificate 148 issued to the agent 1016 operating on the managed node 106 by the core server 1004 during the operations described in connection with FIGS. 7 and 8. The administrative server 1002 may use the managed node certificate 148 to create and send 1021 a secure token to the agent 1016. The secure token sent 1021 to the agent 1016 may be referred to as an agent secure token 126.

The agent 1016 may send 1023 a request for updated agent policies 128 to the administrative server 1002. The agent 1016 may be configured to periodically poll the administrative server 1002 for updated agent policies 128. The agent 1016 may be instructed to poll the administrative server 1002 for updated agent policies 128 at the discretion of the core server 1004 administrator using configuration contained in the agent policies 128. In response to the request updated agent policies 128, the administrative server 1002 may recognize that the agent 1016 is listed as one affected by a recent update of agent policies 128. The administrative server 1002 may send 1025 updated agent policies 128 to the agent 1016. The agent 1016 may store 1027 the updated agent policies 128 and apply the new agent policies 128 to the managed node 106.

Figure 11:
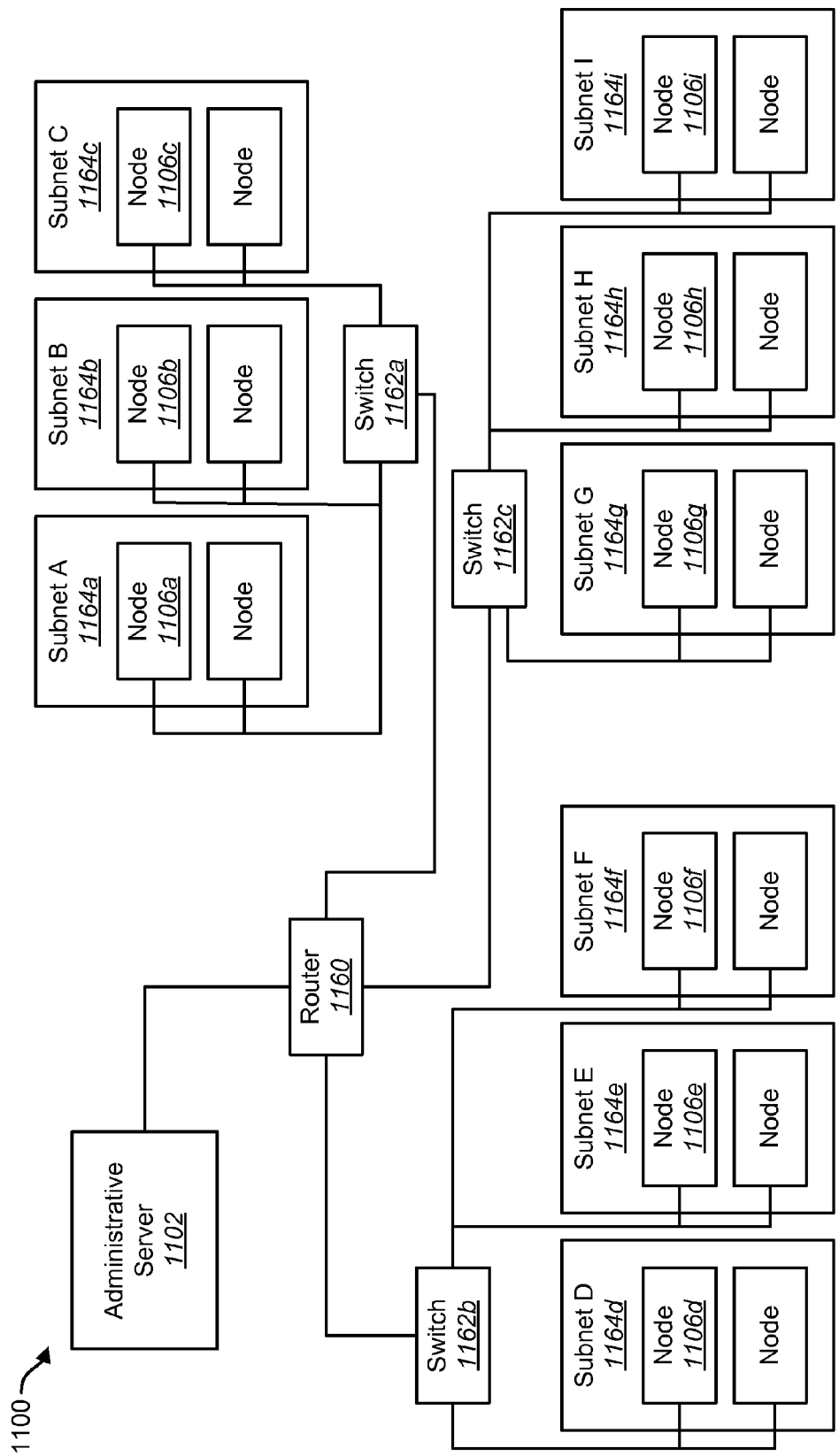
FIG. 11 is a block diagram that illustrates one configuration of a network where systems and methods for managing an agent by an administrative server may be implemented.

FIG. 11 is a block diagram that illustrates one configuration of a network 1100 where systems and methods for enrolling and configuring agents 116 by an administrative server 102 may be implemented.

An administrative server 1102 is connected to a router 1160. The router 1160 is connected to switches 1162a, 1162b, 1162c. The switch 1162a is connected to several nodes 1106a, 1106b, 1106c, etc., via their respective subnets 1164a, 1164b, 1164c. The switch 1162b is connected to several nodes 1106d, 1106e, 1106f, etc., via their respective subnets 1164d, 1164e, 1164f. The switch 1162c is connected to several nodes 1106g, 1106h, 1106i, etc., via their respective subnets 1164g, 1164h, 1164i. Although FIG. 11 only shows one router 1160 and a limited number of switches 1162, subnets 1164 and nodes 1106, many and varied numbers of routers 1160, switches 1162, subnets 1164 and nodes 1106 may be included in networks and/or systems that may implement systems and methods for network management. It should be noted that one or more of the nodes 1106a-i may be examples of one or more of the nodes 106, 306 and 506 described herein. Additionally or alternatively, the administrative server 1102 may be one example of the administrative servers 102, 302, 402, 502, 602, 702, 802, 902 and 1002 described herein.

Figure 12:
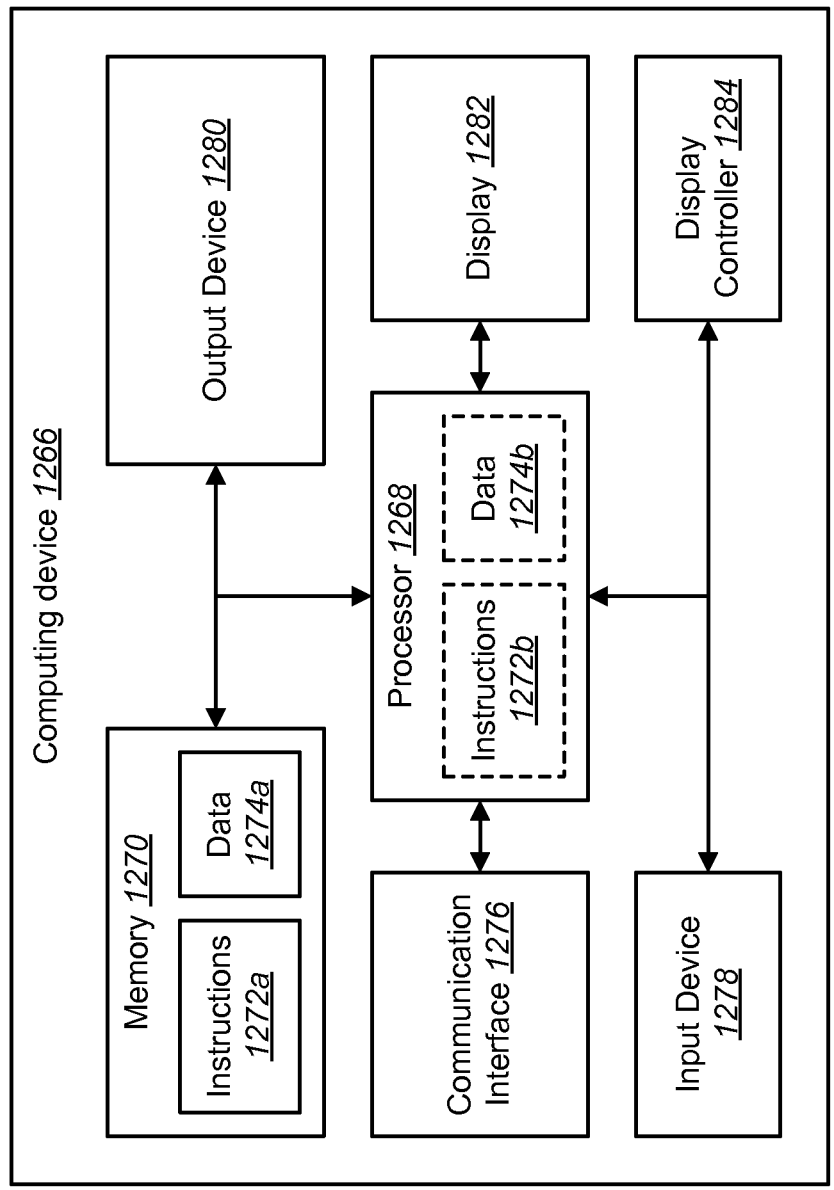
FIG. 12 illustrates various components that may be utilized in a computing device.

FIG. 12 illustrates various components that may be utilized in a computing device 1266. The computing device 1266 may be configured in accordance with one or more of the administrative servers 102, 302, 402, 502, 602, 702, 802, 902 and 1002, core servers 104, 304, 404, 504, 604, 704. 804, 904 and 1004 and managed nodes 106, 306 and 406 described herein. The computing device 1266 may include a processor 1268 and memory 1270. The memory 1270 may include instructions 1272a and data 1274a. The processor 1268 controls the operation of the computing device 1266 and may be, for example, a microprocessor, a microcontroller, a digital signal processor (DSP) or other device known in the art. The processor 1268 typically performs logical and arithmetic operations based on program instructions 1272b and/or data 1274b received from the memory 1270.

The computing device 1266 typically may include one or more communication interfaces 1276 for communicating with other electronic devices. The communication interfaces 1276 may be based on wired communication technology, wireless communication technology or both. Examples of different types of communication interfaces 1276 include a serial port, a parallel port, a Universal Serial Bus (USB), an Ethernet adapter, an IEEE bus interface, a small computer system interface (SCSI) bus interface, an infrared (IR) communication port, a Bluetooth wireless communication adapter and so forth.

The computing device 1266 typically may include one or more input devices 1278 and one or more output devices 1280. Examples of different kinds of input devices 1278 include a keyboard, mouse, microphone, remote control device, button, joystick, trackball, touchpad, lightpen, etc. Examples of different kinds of output devices 1280 include a speaker, printer, etc. One specific type of output device that may be included in a computer system is a display device 1282. Display devices 1282 used with configurations disclosed herein may utilize any suitable image projection technology, such as liquid crystal display (LCD), light-emitting diode (LED), gas plasma, electroluminescence, a cathode ray tube (CRT) or the like.

A display controller 1284 may also be provided, for converting data stored in the memory 1270 into text, graphics and/or moving images (as appropriate) shown on the display device 1282. Of course, FIG. 12 illustrates only one possible configuration of a computing device 1266. Various other architectures and components may be utilized.

In the above description, reference numbers have sometimes been used in connection with various terms. Where a term is used in connection with a reference number, this is meant to refer to a specific element that is shown in one or more of the Figures. Where a term is used without a reference number, this is meant to refer generally to the term without limitation to any particular Figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

The term "computer-readable medium" refers to any available non-transitory tangible medium that can be accessed by a computer or processor. By way of example, and not limitation, a computer-readable medium may comprise RAM, ROM, EEPROM, CD-ROM or other optical disk storage, magnetic disk storage or other magnetic storage devices or any other medium that can be used to carry or store desired program code in the form of instructions or data structures and that can be accessed by a computer. Disk and disc, as used herein, include compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server or other remote source using a coaxial cable, fiber optic cable, twisted pair, digital subscriber line (DSL) or wireless technologies such as infrared, radio, and microwave, then the coaxial cable, fiber optic cable, twisted pair, DSL or wireless technologies such as infrared, radio and microwave are included in the definition of transmission medium.

The methods disclosed herein comprise one or more steps or actions for achieving the described methods. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods and apparatus described herein without departing from the scope of the claims.

What is claimed is:

1. A method of managing an agent by an administrative server, comprising:
    receiving, by the administrative server, an enrollment request from the agent that is running on a computing device, wherein the agent is disconnected from a core server, wherein the administrative server periodically establishes a network connection to the core server to facilitate the enrollment request;
    performing a provisional enrollment procedure with the agent;
    performing an enrollment procedure between the agent and the core server, comprising:
        sending the enrollment request received from the agent to the core server during the network connection; and
        receiving configuration information from the core server; and
    the administrative server facilitating a configuration procedure on the agent based on the configuration information received from the core server, wherein the configuration information is stored at the administrative server and sent to the agent in response to a request from the agent for the configuration information.

2. The method of claim 1, wherein performing the provisional enrollment procedure comprises:
    storing the enrollment request; and
    sending a provisional enrollment policy to the agent in response to the enrollment request.

3. The method of claim 1, wherein performing the enrollment procedure between the agent and the core server comprises:
    receiving an enrollment response and policy from the core server in response to the enrollment request;
    storing the enrollment response and policy;
    receiving a request for the enrollment response and policy from the agent; and
    sending the enrollment response and policy to the agent.

4. The method of claim 1, wherein the enrollment request from the agent is created using authentication information received from the core server via the administrative server.

5. The method of claim 1, wherein the administrative server is a multi-tenant cloud-based administrative server.

6. The method of claim 1, wherein facilitating the configuration procedure on the agent comprises:
    receiving the configuration information from the core server, wherein the configuration information comprises confidential configuration information and non-confidential configuration information;
    storing the configuration information;

sending the configuration information to the agent in response to the request from the agent for the configuration information;

receiving configuration operation results from the agent, wherein the configuration operation results comprise confidential configuration operation results and non-confidential configuration operation results; and sending the configuration operation results to the core server in response to a request from the core server for the configuration operation results.

7. The method of claim 6, wherein the configuration information includes past configurations of the agent with serial numbers indicating latest configuration information.

8. The method of claim 6, wherein the confidential configuration information is encrypted with a digital certificate public key of the agent and signed with a digital certificate private key of the core server.

9. The method of claim 6, wherein the non-confidential configuration information is signed with a digital certificate private key of the core server.

10. The method of claim 6, wherein the confidential configuration operation results are encrypted with a digital certificate public key of the core server and signed with a digital certificate private key of the agent.

11. The method of claim 6, wherein the non-confidential configuration operation results are signed with a digital certificate private key of the agent.

12. The method of claim 1, further comprising:

receive a request for a secure token from the core server that is based on registration credential information entered into a web portal authenticate the request for the secure token based on input from a human administrative server administrator; and send the secure token to the core server.

13. An administrative server that is configured for managing an agent, comprising:

a processor;

memory in electronic communication with the processor; and instructions stored in the memory, the instructions being executable to:

receive, by the administrative server, an enrollment request from the agent that is running on a computing device, wherein the agent is disconnected from a core server, wherein the administrative server periodically establishes a network connection to the core server to facilitate the enrollment request;

perform a provisional enrollment procedure with the agent;

perform an enrollment procedure between the agent and the core server, comprising instructions executable to:

send the enrollment request received from the agent to the core server during the network connection; and receive configuration information from the core server; and facilitate a configuration procedure on the agent based on the configuration information received from the core server, wherein the configuration information is stored at the administrative server and sent to the agent in response to a request from the agent for the configuration information.

14. The administrative server of claim 13, wherein the instructions executable to perform the provisional enrollment procedure comprise instructions executable to:

store the enrollment request; and send a provisional enrollment policy to the agent in response to the enrollment request.

15. The administrative server of claim 13, wherein the instructions executable to perform the enrollment procedure between the agent and the core server comprise instructions executable to:

receive an enrollment response and policy from the core server in response to the enrollment request;

store the enrollment response and policy;

receive a request for the enrollment response and policy from the agent; and send the enrollment response and policy to the agent.

16. The administrative server of claim 13, wherein the enrollment request from the agent is created using authentication information received from the core server via the administrative server.

17. The administrative server of claim 13, wherein the administrative server is a multi-tenant cloud-based administrative server.

18. The administrative server of claim 13, wherein the instructions executable to facilitate the configuration procedure on the agent comprise instructions executable to:

receive the configuration information from the core server, wherein the configuration information comprises confidential configuration information and non-confidential configuration information;

store the configuration information;

send the configuration information to the agent in response to the request from the agent for the configuration information;

receive configuration operation results from the agent, wherein the configuration operation results comprise confidential configuration operation results and non-confidential configuration operation results; and send the configuration operation results to the core server in response to a request from the core server for the configuration operation results.

19. The administrative server of claim 18, wherein the configuration information includes past configurations of the agent with serial numbers indicating latest configuration information.

20. The administrative server of claim 18, wherein the confidential configuration information is encrypted with a digital certificate public key of the agent and signed with a digital certificate private key of the core server.

21. The administrative server of claim 18, wherein the non-confidential configuration information is signed with a digital certificate private key of the core server.

22. The administrative server of claim 18, wherein the confidential configuration operation results are encrypted with a digital certificate public key of the core server and signed with a digital certificate private key of the agent.

23. The administrative server of claim 18, wherein the non-confidential configuration operation results are signed with a digital certificate private key of the agent.

* * * * *